United States Patent
Jogo et al.

(10) Patent No.: US 10,100,189 B2
(45) Date of Patent: Oct. 16, 2018

(54) THERMOPLASTIC ELASTOMER PELLETS, AND MOLDED ARTICLE FORMED FROM SAID PELLETS

(71) Applicant: KURARAY CO., LTD., Kurashiki-shi (JP)

(72) Inventors: Yosuke Jogo, Kamisu (JP); Chie Suzuki, Kamisu (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/314,268

(22) PCT Filed: May 28, 2015

(86) PCT No.: PCT/JP2015/065379
§ 371 (c)(1),
(2) Date: Nov. 28, 2016

(87) PCT Pub. No.: WO2015/182695
PCT Pub. Date: Dec. 3, 2015

(65) Prior Publication Data
US 2017/0198131 A1 Jul. 13, 2017

(30) Foreign Application Priority Data
May 30, 2014 (JP) ................. 2014-111916

(51) Int. Cl.
| | | |
|---|---|---|
| *C08L 51/00* | (2006.01) | |
| *C08K 5/3435* | (2006.01) | |
| *C08K 5/13* | (2006.01) | |
| *C08K 5/3475* | (2006.01) | |
| *C08F 257/02* | (2006.01) | |
| *C08K 5/1575* | (2006.01) | |
| *C08K 5/134* | (2006.01) | |
| *C08J 3/12* | (2006.01) | |
| *C08K 5/00* | (2006.01) | |
| *C08F 297/04* | (2006.01) | |
| *C08L 53/02* | (2006.01) | |

(52) U.S. Cl.
CPC ......... *C08L 51/003* (2013.01); *C08F 257/02* (2013.01); *C08F 297/046* (2013.01); *C08J 3/124* (2013.01); *C08K 5/005* (2013.01); *C08K 5/13* (2013.01); *C08K 5/134* (2013.01); *C08K 5/1575* (2013.01); *C08K 5/3435* (2013.01); *C08K 5/3475* (2013.01); *C08L 53/025* (2013.01); *C08J 2353/02* (2013.01); *C08K 2201/013* (2013.01); *C08L 2205/025* (2013.01)

(58) Field of Classification Search
CPC ......................................... C08L 53/00–53/025
See application file for complete search history.

(56) References Cited

U.S. PATENT DOCUMENTS

| 6,399,696 B1 | 6/2002 | Toyosawa et al. |
| 2014/0011912 A1 | 1/2014 | Petry et al. |

FOREIGN PATENT DOCUMENTS

| CN | 1630669 A | 6/2005 | |
| CN | 1946788 A | 4/2007 | |
| CN | 102884097 A | 1/2013 | |
| JP | 2-36290 A | 2/1990 | |
| JP | 5-98051 A | 4/1993 | |
| JP | 2001-64445 A | 3/2001 | |
| JP | 2002-371136 A | 12/2002 | |
| JP | 2007-126569 A | 5/2007 | |
| JP | 2007-308525 A | 11/2007 | |
| JP | 2009-197049 A | 9/2009 | |
| JP | 2010-77339 A | 4/2010 | |
| JP | 2015-151519 A | 8/2015 | |
| WO | WO-0077118 A1 * | 12/2000 | .......... C09J 153/025 |
| WO | WO 2012/123282 A1 | 9/2012 | |
| WO | 2014/002984 A1 | 1/2014 | |
| WO | 2015/098664 A1 | 7/2015 | |

OTHER PUBLICATIONS

IRGANOX® 1010 (Material Safety Data Sheet, Ciba® Specialty Chemicals, Aug. 1998). (Year: 1998).*
International Search Report dated Aug. 25, 2015 in PCT/JP2015/065379 filed May 28, 2015.
Combined Chinese Office Action and Search Report dated Mar. 7, 2018 in corresponding Patent Application No. 201580028524.4 (with English Translation of Category of Cited Documents), citing documents AO, AP and AQ therein, 6 pages.
Extended European Search Report dated Jan. 18, 2018 in Patent Application No. 15799802.2, citing documents AA and AO therein, 11 pages.

* cited by examiner

*Primary Examiner* — Alexandre F Ferre
(74) *Attorney, Agent, or Firm* — Oblon, McClelland, Maier & Neustadt, L.L.P.

(57) ABSTRACT

Provided are a thermoplastic elastomer composition containing 100 parts by mass of (a) a specified hydrogenated block copolymer and 0.01 to 5 parts by mass of (b) at least one additive selected from an antioxidant and a light stabilizer, wherein the additive (b) is soluble in toluene at room temperature, and the additive (b) exists in the inside and on the surface of the pellet; and a molded article formed from the pellet.

12 Claims, No Drawings

THERMOPLASTIC ELASTOMER PELLETS, AND MOLDED ARTICLE FORMED FROM SAID PELLETS

CROSS-REFERENCE TO RELATED APPLICATIONS

This application is a National Stage of PCT/JP2015/065379, which was filed on May 28, 2015. This application is based upon and claims the benefit of priority to Japanese Application No. 2014-111916, which was filed on May 30, 2014.

TECHNICAL FIELD

The present invention relates to a thermoplastic elastomer pellet and a molded article formed from the pellet.

BACKGROUND ART

In recent years, thermoplastic elastomers which while having rubber elasticity at normal temperature, do not require a vulcanization step, and similar to thermoplastic resins, are capable of being subjected to forming processing and recycling are frequently used in fields of automotive parts, household electrical appliances, wire covering, medical parts, miscellaneous goods, footwears, and so on. As such thermoplastic elastomers, thermoplastic elastomers containing a hydrogenated block copolymer obtained through hydrogenation of a block copolymer (for example, a styrene-conjugated diene copolymer) having a polymer block composed mainly of an aromatic vinyl compound and a polymer block composed mainly of a conjugated diene compound are known.

The aforementioned hydrogenated block copolymer-containing thermoplastic elastomers can be blended with a rubber softener, a polyolefin resin, such as polypropylene, etc., and so on, and become a material with excellent transparency depending upon a blending ratio, and thus, they are widely utilized for applications bringing out the transparency, such as medical applications, covering materials, packaging materials, toys, etc.

However, a pellet obtained by granulating such a hydrogenated block copolymer-containing thermoplastic elastomer is liable to cause blocking, and there is a case where it becomes difficult to feed the pellet into a blending apparatus or a forming apparatus.

As a method of improving blocking of such a pellet of an elastomer composition, there are known a method of applying an inorganic filler, such as silica, talc, etc., a method of applying a polypropylene fine powder (see PTL 1), a method of impregnating a metallic soap (PTL 2), and so on. However, in pellets of elastomer compositions obtained by these methods, there is a case where in applications requiring especially transparency, the transparency is insufficient, and there was room for improvement.

In addition, the aforementioned hydrogenated block copolymer-containing thermoplastic elastomers are also utilized as a pressure sensitive adhesive upon being blended with a tackifier resin. For example, PTL 3 discloses a method in which in a pressure sensitive adhesive containing a pressure-sensitive adhesive polymer (for example, a styrene-based elastomer) and a tackifier resin, by using an anti-blocking agent having compatibility with the pressure-sensitive adhesive polymer, bleedout of the anti-blocking agent in the pressure sensitive adhesive is prevented from occurring. However, as a result of investigations made by the present inventor and others, it has become clear that because of insufficient transparency and tackiness, there is room for improvement.

CITATION LIST

Patent Literature

PTL 1: JP 2002-371136 A
PTL 2: JP 2007-308525 A
PTL 3: JP 2007-126569 A

SUMMARY OF INVENTION

Technical Problem

An object of the present invention is to provide a thermoplastic elastomer pellet having both tackiness and blocking resistance and also having excellent transparency and a molded article formed from the pellet.

The present inventor and others made extensive and intensive investigations. As a result, it has been found that by allowing a specified additive to exist in the inside and on the surface of a thermoplastic elastomer pellet, the aforementioned problem can be solved, leading to accomplishment of the present invention.

Solution to Problem

Specifically, the present invention relates to the following [1] to [5].

[1] A thermoplastic elastomer pellet that is a pellet of a thermoplastic elastomer composition containing 100 parts by mass of (a) a hydrogenated block copolymer and 0.01 to 5 parts by mass of (b) at least one additive selected from an antioxidant and a light stabilizer, wherein
the hydrogenated block copolymer (a) is a hydrogenated product of a block copolymer having a polymer block A composed of a structural unit derived from an aromatic vinyl compound and a polymer block B composed of a structural unit derived from a conjugated diene compound;
the additive (b) is soluble in toluene at room temperature; and
the additive (b) exists in the inside and on the surface of the pellet.

[2] The thermoplastic elastomer pellet as set forth in the above [1], wherein in the additive (b), a mass ratio ((b-1)/(b-2)) of an additive (b-1) existing on the surface and an additive (b-2) existing in the inside is 0.05 to 50.

[3] The thermoplastic elastomer pellet as set forth in the above [1] or [2], wherein the hydrogenated block copolymer (a) is at least one selected from a hydrogenated block copolymer (a1) represented by $(A-B)_n$ and a hydrogenated block copolymer (a2) represented by A-B-A or $(A-B)_m$-X (in the formulae, As, which are the same as or different from every other, each represent a polymer block A composed of a structural unit derived from an aromatic vinyl compound; Bs, which are the same as or different from every other, each represent a polymer block B composed of a structural unit derived from a conjugated diene compound; n represents an integer of 1 to 3; m represents an integer of 1 or more; and X represents a coupling agent residue).

[4] The thermoplastic elastomer pellet as set forth in the above [3], wherein the hydrogenated block copolymer (a) is a mixture of the hydrogenated block copolymer (a1) and the hydrogenated block copolymer (a2), and a mass ratio of the hydrogenated block copolymer (a1) and the hydrogenated block copolymer (a2) is 90/10 to 10/90.

[5] A molded article obtained by forming from the thermoplastic elastomer pellet as set forth in any of the above [1] to [4].

Advantageous Effects of Invention

In accordance with the present invention, it is possible to provide a thermoplastic elastomer pellet having both tackiness and blocking resistance and also having excellent transparency and a molded article formed from the pellet.

DESCRIPTION OF EMBODIMENTS

The thermoplastic elastomer pellet according to the present invention is a pellet of a thermoplastic elastomer composition containing 100 parts by mass of (a) a hydrogenated block copolymer and 0.01 to 5 parts by mass of (b) at least one additive selected from an antioxidant and a light stabilizer, wherein the hydrogenated block copolymer (a) is a hydrogenated product of a block copolymer having a polymer block A composed of a structural unit derived from an aromatic vinyl compound and a polymer block B composed of a structural unit derived from a conjugated diene compound; the additive (b) is soluble in toluene at room temperature; and the additive (b) exists in the inside and on the surface of the pellet.

[Hydrogenated Block Copolymer (a)]

The hydrogenated block copolymer (a) is a hydrogenated product of a block copolymer having a polymer block A composed of an aromatic vinyl compound-derived structural unit and a polymer block B composed of a conjugated diene compound-derived structural unit.

(Polymer Block A)

The polymer block A in the hydrogenated block copolymer (a) is composed of a structural unit derived from an aromatic vinyl compound. The term "derived" as referred to herein means that the structural unit is a structural unit formed as a result of addition polymerization of an aromatic vinyl compound. Among the structural units constituting the polymer block A, it is preferred that at least 50% thereof is composed of a structural unit derived from an aromatic vinyl compound; it is more preferred that 80% or more thereof is composed of a structural unit derived from an aromatic vinyl compound; it is still more preferred that 90% or more thereof is composed of a structural unit derived from an aromatic vinyl compound; and 100% thereof may be composed of a structural unit derived from an aromatic vinyl compound. Examples of the aromatic vinyl compound include styrene, α-methylstyrene, o-methylstyrene, m-methylstyrene, p-methylstyrene, p-t-butylstyrene, 2-methylstyrene, 3-methylstyrene, 4-methylstyrene, 4-propylstyrene, 2,4-dimethylstyrene, 4-cyclohexylstyrene, 4-dodecylstyrene, 2-ethyl-4-benzylstyrene, 4-(phenylbutyl)styrene, vinyltoluene, 1-vinylnaphthalene, 2-vinylnaphthalene, and the like. Of those, styrene or α-methylstyrene is preferred, and styrene is most preferred. The polymer block A may be constituted of only one of these aromatic vinyl compounds, or may be constituted of two or more thereof.

So long as the object and the effect of the present invention are not impaired, the polymer block A may contain other unsaturated monomer than the aromatic vinyl compound. As such other unsaturated monomer, there is exemplified at least one selected from conjugated dienes, such as butadiene, isoprene, 2,3-dimethyl-1,3-butadiene, 1,3-pentadiene, 1,3-hexadiene, isobutylene, etc., methyl methacrylate, methyl vinyl ether, N-vinylcarbazole, β-pinene, 8,9-p-menthene, dipentene, methylene norbornene, 2-methylenetetrahydrofuran, and the like. In the case where the polymer block A contains such other unsaturated monomer unit, a bonding mode thereof is not particularly limited and may be either a random mode or a tapered mode. A content proportion of such other unsaturated monomer is preferably 50% by mass or less, and more preferably 20% by mass or less.

A weight average molecular weight of the polymer block A is preferably 1,000 to 100,000, and more preferably 1,500 to 50,000. All of the terms "weight average molecular weight" as described in the present specification are a weight average molecular weight as converted to standard polystyrene by means of gel permeation chromatography (GPC) measurement.

A content of the aromatic vinyl compound-derived structural unit in the hydrogenated block copolymer (a) is preferably within the range of from 3 to 40% by mass, more preferably within the range of from 5 to 30% by mass, and still more preferably within the range of 7 to 20% by mass from the viewpoints of flexibility and the like of the resulting thermoplastic elastomer composition. The content of the aromatic vinyl compound-derived structural unit in the hydrogenated block copolymer may be, for example, determined by means of $^1$H-NMR spectrometry or the like.

(Polymer Block B)

The polymer block B in the hydrogenated block copolymer (a) is composed of a structural unit derived from a conjugated diene compound. The term "derived" as referred to herein means that the structural unit is a structural unit formed as a result of addition polymerization of a conjugated diene compound. Among the structural units constituting the polymer block B, it is preferred that at least 50% thereof is composed of a structural unit derived from a conjugated diene compound; it is more preferred that 80% or more thereof is composed of a structural unit derived from a conjugated diene compound; it is still more preferred that 90% or more thereof is composed of a structural unit derived from a conjugated diene compound; and 100% thereof may be composed of a structural unit derived from a conjugated diene compound. Examples of the conjugated diene compound include butadiene, isoprene, 2,3-dimethylbutadiene, 1,3-pentadiene, 1,3-hexadiene, and the like. Of those, butadiene, isoprene, or a mixture of butadiene and isoprene is preferred, and isoprene is more preferred.

The polymer block B may be constituted of a structural unit derived from only one of these conjugated diene compounds, or may be constituted of a structural unit derived from two or more thereof. In the case where the polymer block B is constituted of a structural unit derived from two or more conjugated diene compounds (for example, butadiene and isoprene), its constitution ratio or polymerization mode (for example, a block, random, tapered, completely alternating, or partial block polymerization mode, etc.) is not particularly limited.

A bonding mode (microstructure) of the conjugated diene compound in the polymerization block B is not particularly limited. For example, in the case of butadiene, a bonding mode of 1,2-bond (vinyl bond) or 1,4-bond may be taken, and in the case of isoprene, a bonding mode of 1,2-bond (vinyl bond), 3,4-bond (vinyl bond) or 1,4-bond may be taken. Only one of those bonds may be present, or two or more thereof may be present. In addition, any of those bonding modes may be present in any proportion.

In addition, an amount of the 1,4-bond of the polymer block B composed of a structural unit derived from a conjugated diene compound in the hydrogenated block copolymer (a) is preferably in the range of from 5 to 99%, and more preferably in the range of from 25 to 95%. The amount of the 1,4-bond of the polymer block B may be, for example, determined from the block copolymer before the hydrogenation by means of $^1$H-NMR spectrometry or the like.

In addition, so long as the object and the effect of the present invention are not impaired, the polymer block B may contain a structural unit derived from other polymerizable monomer than the conjugated diene compound. As such other polymerizable monomer, there is exemplified at least one selected from aromatic vinyl compounds, such as styrene, α-methylstyrene, o-methylstyrene, m-methylstyrene, p-methylstyrene, p-t-butylstyrene, 2,4-dimethylstyrene, vinylnaphthalene, vinylanthracene, etc., methyl methacrylate, methyl vinyl ether, N-vinylcarbazole, β-pinene, 8,9-p-menthene, dipentene, methylene norbornene, 2-methylenetetrahydrofuran, and the like. In the case where the polymer block B contains a structural unit derived from other polymerizable monomer than the conjugated diene compound, a bonding mode thereof is not particularly limited and may be either a random mode or a tapered mode. A content proportion of such other polymerizable monomer is preferably 50% by mass or less, and more preferably 20% by mass or less.

A weight average molecular weight of the polymer block B is preferably 5,000 to 300,000, and more preferably 10,000 to 200,000.

(Degree of Hydrogenation)

The hydrogenated block copolymer (a) is one obtained through hydrogenation of a block copolymer having the polymer block A and the polymer block B, and it is preferred that a carbon-carbon double bond derived from the conjugated diene compound in the polymer block B is hydrogenated. From the viewpoints of heat resistance and weather resistance, a degree of hydrogenation is preferably 50 mol % or more, more preferably 80 mol % or more, and still more preferably 90 mol % or more. The degree of hydrogenation may be determined from a measured value obtained by measuring the content of the carbon-carbon double bond derived from the conjugated diene compound unit in the polymer block B before and after the hydrogenation by means of iodine value titration, infrared spectrophotometry, $^1$H-NMR spectrometry, or the like.

(Bonding Mode Between Polymer Block a and Polymer Block B)

So long as the polymer block A and the polymer block B are bonded to each other, a bonding mode in the hydrogenated block copolymer (a) is not limited, and it may be linear, branched, or radial, or in any combination of two or more thereof. Above all, as for the bonding mode between the polymer block A and the polymer block B, when the polymer block A is represented by A, and the polymer block B is represented by B, a hydrogenated block copolymer (a1) represented by $(A-B)_n$, a hydrogenated block copolymer (a2) represented by A-B-A or $(A-B)_m$-X, or the like is preferably used. Here, n represents an integer of 1 to 3, m represents an integer of 1 or more, and X represents a coupling agent residue.

Examples of the bonding mode between the polymer block A and the polymer block B of the hydrogenated block copolymer (a1) represented by the general formula: $(A-B)_n$ include A-B-A-B-A-B (n=3), A-B-A-B (n=2), and A-B (n=1).

From the standpoints of easiness of production and workability, as for the hydrogenated block copolymer (a2) represented by the general formula: A-B-A or $(A-B)_m$-X, a triblock copolymer represented by A-B-A or a star-shaped block copolymer wherein m is 2 or more and 4 or less is preferably used, and a triblock copolymer represented by A-B-A is more preferably used.

Examples of the coupling agent residue X include a coupling agent residue derived from a coupling agent as exemplified in a production method of the hydrogenated block copolymer (a) as described later, and the like.

Of those, from the standpoints of easiness of production and tackiness, a diblock copolymer represented by A-B is preferably used. The hydrogenated block copolymer (a) is preferably at least one selected from the hydrogenated block copolymer (a1) and the hydrogenated block copolymer (a2) from the viewpoint that it has both tackiness and blocking resistance.

In addition, in the hydrogenated block copolymer (a), a polymer block C which is composed of other polymerizable monomer, other than the polymer block A and the polymer block B may be present within the range where the object of the present invention is not impaired. In this case, when the polymer block C is represented by C, examples of the structure of the block copolymer include an A-B-C type triblock copolymer, an A-B-C-A type tetra-block copolymer, an A-B-A-C type tetra-block copolymer, and the like.

A weight average molecular weight of the hydrogenated block copolymer (a1) is preferably within the range of from 10,000 to 300,000, more preferably within the range of from 20,000 to 200,000, still more preferably within the range of from 30,000 to 150,000, and most preferably within the range of from 40,000 to 100,000. When the weight average molecular weight of the hydrogenated block copolymer (a1) falls within the aforementioned range, there is a tendency that the blocking resistance of a thermoplastic elastomer pellet containing the hydrogenated block copolymer (a) is more improved. In addition, in the case where the weight average molecular weight of the hydrogenated block copolymer (a1) is more than 300,000, there is a tendency that the formability of the thermoplastic elastomer pellet is inferior.

In addition, a weight average molecular weight of the hydrogenated block copolymer (a2) is preferably within the range of from 50,000 to 500,000, more preferably within the range of from 70,000 to 400,000, and still more preferably within the range of from 100,000 to 300,000. When the weight average molecular weight of the hydrogenated block copolymer (a2) falls within the aforementioned range, there is a tendency that the blocking resistance of a thermoplastic elastomer pellet containing the hydrogenated block copolymer (a) is more improved. In addition, in the case where the weight average molecular weight of the hydrogenated block copolymer (a2) is more than 500,000, there is a tendency that the formability of the thermoplastic elastomer pellet containing the hydrogenated block copolymer (a) is inferior. The weight average molecular weight as referred to herein means a weight average molecular weight as converted to polystyrene by means of gel permeation chromatography (GPC) measurement.

So long as the object and the effect of the present invention are not impaired, the hydrogenated block copolymer (a) may have one or more functional groups, such as a carboxyl group, a hydroxyl group, an acid anhydride group, an amino group, an epoxy group, etc., in a molecular chain and/or molecular terminals.

In the thermoplastic elastomer composition of the present invention, the hydrogenated block copolymer (a) may be a single material, or may be a mixture of two or more thereof. Above all, the hydrogenated block copolymer (a) is preferably a mixture of the hydrogenated block copolymer (a1) represented by (A-B)$_n$ and the hydrogenated block copolymer (a2) represented by A-B-A or (A-B)$_m$-X (in the formulae, As, which are the same as or different from every other, each represent a polymer block A composed of a structural unit derived from an aromatic vinyl compound; Bs, which are the same as or different from every other, each represent a polymer block B composed of a structural unit derived from a conjugated diene compound; n represents an integer of 1 to 3; m represents an integer of 1 or more; and X represents a coupling agent residue) from the viewpoint of tackiness, blocking resistance, and transparency.

In the case where the hydrogenated block copolymer (a) is a mixture of the hydrogenated block copolymers (a1) and (a2), its mass ratio is preferably within the range of from 90/10 to 10/90, more preferably within the range of from 85/15 to 30/70, still more preferably within the range of from 80/20 to 40/60, and yet still more preferably within the range of from 70/30 to 50/50 from the viewpoints of blocking resistance and tackiness of the resulting thermoplastic elastomer pellet. The mass ratio of the hydrogenated block copolymer (a1) and the hydrogenated block copolymer (a2) may be determined from an elution curve obtained by means of gel permeation chromatography (GPC) measurement.

In the case where the hydrogenated block copolymer (a) is a mixture of the hydrogenated block copolymers (a1) and (a2), a combination of (a1) and (a2) is not particularly limited. However, from the viewpoint of transparency, a ratio of ($\alpha$)/($\beta$) of an amount ($\alpha$) of the 1-4-bond that the polymer block B of the hydrogenated block copolymer (a1) has to an amount ($\beta$) of the 1,4-bond that the polymer block B of the hydrogenated block copolymer (a2) has is preferably in the range of from 0.5 to 2, more preferably in the range of from 0.8 to 1.25, and still more preferably in the range of from 0.9 to 1.2. In addition, from the same viewpoint, it is preferred that the structural units derived from the conjugated diene compounds each constituting the polymer block B of the hydrogenated block copolymers (a1) and (a2) are the same.

(Production Method of Hydrogenated Block Copolymer (a))

The hydrogenated block copolymer (a) may be, for example, produced by an anion polymerization method. Specifically, the hydrogenated block copolymer (a) may be produced by (i) a method of successively polymerizing an aromatic vinyl compound and a conjugated diene compound with an alkyllithium compound serving as an initiator; (ii) a method of successively polymerizing an aromatic vinyl compound and a conjugated diene compound with an alkyllithium compound serving as an initiator, followed by coupling by the addition of a coupling agent; (iii) a method of polymerizing a conjugated diene compound and successively polymerizing an aromatic vinyl compound with a dilithium compound serving as an initiator, followed by hydrogenation reaction; or the like.

Examples of the alkyllithium compound include methyllithium, ethyllithium, n-butyllithium, sec-butyllithium, tert-butyllithium, pentyllithium, and the like.

Examples of the coupling agent include divinylbenzene; polyvalent epoxy compounds, such as epoxidized 1,2-polybutadiene, epoxidized soybean oil, 1,3-bis(N,N-glycidylaminomethyl)cyclohexane, etc.; halogen compounds, such as dimethylchlorosilane, dimethyldibromosilane, trichlorosilane, methyltrichlorosilane, tetrachlorosilane, tetrachlorotin, etc.; ester compounds, such as methyl benzoate, ethyl benzoate, phenyl benzoate, diethyl oxalate, diethyl malonate, diethyl adipate, dioctyl adipate, dimethyl phthalate, diethyl phthalate, dimethyl isophthalate, dimethyl terephthalate, etc.; carbonic acid ester compounds, such as dimethyl carbonate, diethyl carbonate, diphenyl carbonate, etc.; alkoxysilane compounds, such as dimethyldimethoxysilane, methyltrimethoxysilane, methyltriethoxysilane, tetramethoxysilane, tetraethoxysilane, bis(trimethoxysilyl)hexane, bis(triethoxysilyl)ethane, etc.; and the like. In addition, examples of the dilithium compound include naphthalenedilithium, dilithiohexylbenzene, and the like.

It is preferred that the polymerization reaction is performed in the presence of a solvent. The solvent is not particularly limited so long as it is inert against the initiator and does not adversely affect the reaction. Examples thereof include saturated aliphatic hydrocarbons or aromatic hydrocarbons, such as hexane, cyclohexane, heptane, octane, decane, toluene, benzene, xylene, etc. In addition, the polymerization reaction is typically performed at a temperature ranging from 0 to 100° C. for 0.5 to 50 hours.

In addition, a Lewis base may be used as a cocatalyst on the occasion of the polymerization. Examples of the Lewis base include ethers, such as dimethyl ether, diethyl ether, tetrahydrofuran, etc.; glycol ethers, such as ethylene glycol dimethyl ether, diethylene glycol dimethyl ether, etc.; amines, such as triethylamine, N,N,N',N'-tetramethylethylenediamine, N-methylmorpholine, etc.; and the like. Only one, or two or more of these Lewis bases may be used.

In the case of isolating the block copolymer, the block copolymer may be isolated by after performing the polymerization by the aforementioned method, pouring the polymerization reaction liquid into a poor solvent for the block copolymer, such as methanol, etc., to coagulate the block copolymer, or pouring the polymerization reaction liquid into hot water together with steam and removing the solvent through azeotropy (steam stripping), followed by drying.

The hydrogenation reaction of the block copolymer may be typically performed in the presence of a hydrogenation catalyst, for example, Raney nickel; a heterogeneous catalyst having a metal (e.g., Pt, Pd, Ru, Rh, Ni, etc.) supported on a carrier (e.g., carbon, alumina, diatomaceous earth, etc.); a Ziegler type catalyst composed of a combination of a transition metal compound (e.g., nickel octylate, nickel naphthenate, nickel acetylacetonate, cobalt octylate, cobalt naphthenate, cobalt acetylacetonate, etc.) with an organoaluminum compound (e.g., triethylaluminum, triisobutylaluminum, etc.) or an organolithium compound, or like; a metallocene type catalyst composed of a combination of a bis(cyclopentadienyl) compound of a transition metal (e.g., titanium, zirconium, hafnium, etc.) with an organometallic compound composed of lithium, sodium, potassium, aluminum, zinc, magnesium, etc.; or the like, under a condition at a reaction temperature of 20 to 200° C. and at a hydrogen pressure of 0.1 to 20 MPa for a reaction time of 0.1 to 100 hours.

The hydrogenation reaction may be performed continuously to the polymerization reaction, or after once isolating the block copolymer, hydrogenation may be performed. In the case of continuously performing the polymerization and the hydrogenation reaction, the hydrogenated block copolymer may be isolated by pouring the hydrogenation reaction liquid into a poor solvent for the hydrogenated block copolymer, such as methanol, etc., to coagulate the hydrogenated block copolymer, or pouring the hydrogenation reaction liquid into hot water together with steam and removing the solvent through azeotropy (steam stripping), followed by drying.

In the case where the hydrogenated block copolymer (a) is a mixture of the hydrogenated block copolymer (a1) and the hydrogenated block copolymer (a2), its production method is not particularly limited. Examples of the production method include a method in which the hydrogenated block copolymer (a1) and the hydrogenated block copolymer (a2) are produced, respectively and dried to obtain hydrogenated block copolymers, followed by blending them to obtain the hydrogenated block copolymer (a); a method in which polymerization liquids after the polymerization reaction at the time of production of hydrogenated block copolymers are blended, followed by hydrogenation reaction to obtain the hydrogenated block copolymer (a); a method in which reaction liquids after hydrogenation reaction at the time of production of hydrogenated block copolymers are blended to obtain the hydrogenated block copolymer (a); a method in which on the occasion of polymerizing block copolymers, a coupling agent is added, the coupling amount is controlled to obtain a mixture composed of an unhydrogenated block copolymer of the hydrogenated block copolymer (a1) and an unhydrogenated block copolymer of the hydrogenated block copolymer (a2), followed by carrying out the hydrogenation reaction to obtain the hydrogenated block copolymer (a); and the like. In the case of obtaining the hydrogenated block copolymer (a) by the coupling method, a mass ratio of the hydrogenated block copolymer (a1) and the hydrogenated block copolymer (a2) may be controlled by an addition amount of the coupling agent added.

[Additive (b)]

As for the additive (b) selected from an antioxidant and a light stabilizer, which is contained in the thermoplastic elastomer pellet, examples of the antioxidant include a phenol-based antioxidant, a phosphorus-based antioxidant, a sulfur-based antioxidant, an amine-based antioxidant, and the like; and examples of the light stabilizer include a salicylic acid derivative, a benzophenone-based light stabilizer, a benzotriazole-based light stabilizer, a hindered amine-based light stabilizer, and the like. In the present specification, the "light stabilizer" also includes a "UV absorbent".

Of those antioxidants, a phenol-based antioxidant is preferred. Examples of the phenol-based antioxidant include 2,6-di-tert-butyl-4-methylphenol, [3,3-bis(3-tert-butyl-4-hydroxyphenyl)butyric acid]ethylene ester, 1,1,3-tris-(2-methyl-4-hydroxy-5-tert-butylphenyl)butane, triethylene glycol-bis[3-(3-tert-butyl-5-methyl-hydroxyphenyl)propionate], 3,9-bis[2-[3-(3-tert-butyl-4-hydroxy-5-methylphenyl)propionyloxy]-1,1-dimethylethyl]-2,4-8,10-tetraoxaspiro[5,5]undecane, 1,3,5-tris(4-tert-butyl-3-hydroxy-2,6-dimethylbenzyl)isocyanurate, n-octadecyl-3-(4'-hydroxy-3', 5'-di-tert-butylphenyl)propionate, tetrakis-[methylene-3-(3', 5'-di-tert-butyl-4'-hydroxyphenyl)propionate]methane, tris-(3,5-di-tert-butyl-4-hydroxybenzyl)-isocyanurate, 1,3,5-trimethyl-2,4,6-tris(3,5-di-tert-butyl-4-hydroxybenzyl)benzene, 1,6-hexanediol-bis[3-(3,5-di-tert-butyl-4-hydroxyphenyl)propionate], 2,4-bis(n-octylthio)-6-(4-hydroxy-3,5-di-tert-butylanilino)-1,3,5-triazine, 2,2-thiodiethylene-bis[3-(3,5-di-tert-butyl-4-hydroxyphenyl)propionate], N,N'-hexamethylenebis(3,5-di-tert-butyl-4-hydroxy-hydrocinnamide), bis(3,5-di-tert-butyl-4-hydroxybenzylphosphonosulfonic acid ethyl)calcium, 3,5-di-tert-butyl-4-hydroxybenzyl-phosphonate-diethyl ester, 2-tert-butyl-6-(3'-tert-butyl-5'-methyl-2'-hydroxybenzyl)-4-methylphenyl acrylate, 2-[1-(2-hydroxy-3,5-di-tert-pentylphenyl)-ethyl]-4,6-di-tert-pentylphenyl acrylate, octadecyl-3-(3,5-di-tert-butyl-4-hydroxyphenyl)propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl)methyl]-1,3,5-triazine-2,4,6(1H,3H,5H)-trione, and the like.

In addition, of those light stabilizers, a benzotriazole-based light stabilizer or a hindered amine-based light stabilizer is preferred.

Examples of the benzotriazole-based light stabilizer include 2-(2'-hydroxy-5'-methyl-phenyl)benzotriazole, 2-(2'-hydroxy-3',5'-di-tert-butyl-phenyl)benzotriazole, 2-(2'-hydroxy-3'-tert-butyl-5'-methyl-phenyl)-5-chloro-triazole, 2-(2'-hydroxy-3',5'-di-tertbutyl-phenyl)-5-chlorobenzotriazole, 2-(2'-hydroxy-5'-tert-butyl-octylphenyl)benzotriazole, 2-(2'-hydroxy-3',5'-di-tert-amylphenyl)benzotriazole, 2-[2'-hydroxy-3'-(3",4",5",6"-tetrahydrophthalimidomethyl)-5'-methylphenyl]benzotriazole, 2,2'-methylenebis[4-(1,1,3,3-tetramethylbutyl)-6-(2H-benzotriazol-2-yl)phenol], 2-[2-hydroxy-3,5-bis($\alpha$,$\alpha$-dimethylbenzyl)phenyl]-2H-benzotriazole, 2-(2-hydroxy-4-octyloxyphenyl)-2H-benzotriazole, 6-(2-benzotriazolyl)-4-tert-butyl-octyl-6'-tert-butyl-4'-methyl-2,2'-methylenebisphenol, and the like. Examples of the hindered amine-based light stabilizer include bis(2,2,6,6-tetramethyl-4-piperidyl)sebacate, bis(1,2,2,6,6-pentamethyl-4-piperidyl) sebacate, 1-[2-[3-(3,5-di-tert-butyl-4-hydroxyphenyl)propionyloxy]ethyl]-4-[3-(3,5-di-tert-butyl-4-hydroxyphenyl) propionyloxy]-2,2,6,6-tetramethylpiperidine, 8-acetyl-3-dodecyl-7,7,9,9-tetramethyl-1,3,8-triazaspiro[4,5]decane-2, 4-dione, 4-benzoyloxy-2,2,6,6-tetramethylpiperidine, dimethyl succinate-1-(2-hydroxyethyl)-4-hydroxy-2,2,6,6-tetramethylpiperidine polycondensate, poly[(6-(1,1,3,3-tetramethylbutyl)amino-1,3,5-triazine-2,4-diyl][(2,2,6,6-tetramethyl-4-piperidyl)imino]hexamethylene[[2,2,6,6-tetramethyl-4-piperidyl]imino]], 2-(3,5-di-tert-butyl-4-hydroxy-benzyl)-2-n-butylmalonic acid bis(1,2,2,6,6-pentamethyl-4-piperidyl), tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, a condensate of 1,2,3,4-tetracarboxylic acid, 2,2,6,6-tetramethyl-4-piperidinol, and $\beta$,$\beta$,$\beta'$,$\beta'$-tetramethyl-3,9-(2,4,8,10-tetraoxaspiro[5,5]undecane)diethanol, N,N'-bis(3-aminopropyl)ethylenediamine-2,4-bis[N-butyl-(1,2,2,6,6-pentamethyl-4-piperidyl)amino]-6-chloro-1,3,5-triazine condensate, and the like. Of those antioxidants and light stabilizers, a phenol-based antioxidant is most preferred.

From the viewpoints of transparency and tackiness of the thermoplastic elastomer pellet and the molded article formed from the pellet, it is necessary that the additive (b) is soluble in toluene at room temperature (23° C.). By using, as the additive (b), a material that is soluble in toluene at room temperature, when the thermoplastic elastomer pellet according to the present invention is formed into, for example, a pressure sensitive adhesive film or the like, it may be formed into a film without impairing the transparency that the pellet per se originally has.

In the present specification, as for whether or not "the additive (b) is soluble in toluene at room temperature", for example, when 5 g of the additive (b) is dissolved in 45 g of toluene at room temperature and stirred, the case where a solid of the additive (b) is not confirmed through visual inspection, neither darkness nor cloudiness is observed, and the additive (b) is dissolved may be decided to be "soluble". A solubility of the additive (b) in toluene is preferably 15 g/100 g (at 23° C.) or more.

Moreover, the additive (b) is required to exist in the inside and on the surface of the thermoplastic elastomer pellet. In accordance with the present invention, when an additive which has hitherto been used as an antioxidant or a light stabilizer of a resin composition is not only added in the inside of the composition but also sprinkled onto the surface of the composition, an excellent anti-blocking effect may be exhibited. According to this, an anti-blocking agent that has hitherto been known well may not be used, or its use amount may be decreased, and hence, the pellet according to the present invention is excellent in transparency. In addition, the molded article obtained from the pellet according to the present invention is also excellent in transparency and tackiness. What the additive (b) exists on the surface of the thermoplastic elastomer pellet may be confirmed through observation by a scanning electron microscope (SEM) or the like. In addition, in the present specification, the "additive (b) existing on the surface of the pellet" is one in which after forming the thermoplastic elastomer pellet, the additive (b) is externally added and deposited on the pellet surface, and does not include the case where the additive added in the inside through a pellet forming step comes out on the surface.

It is preferred that the additive (b) is a solid at normal temperature from the standpoint of blocking resistance of the resulting thermoplastic elastomer pellet. In addition, a molecular weight of the additive (b) is preferably 200 to 2,000, more preferably 300 to 1,800, and still more preferably 500 to 1,500.

In the thermoplastic elastomer composition constituting the thermoplastic elastomer pellet according to the present invention, a content of the additive (b) is within the range of from 0.01 to 5 parts by mass, preferably within the range of from 0.1 to 4 parts by mass, more preferably within the range of from 0.2 to 3 parts by mass, and still more preferably within the range of from 0.25 to 2.5 parts by mass based on 100 parts by mass of the hydrogenated block copolymer (a). When the content of the additive (b) is smaller than 0.01 parts by mass, there is a tendency that the blocking resistance of the resulting thermoplastic elastomer pellet is inferior, whereas when it is larger than 5 parts by mass, there is a tendency that the transparency of the resulting thermoplastic elastomer pellet is deteriorated. The content of the additive (b) as referred to herein means a total content of the additive (b) existing in the inside and on the surface of the thermoplastic elastomer pellet.

In addition, in the case where the additive (b) existing on the surface of the thermoplastic elastomer pellet is defined as (b-1), and the additive (b) existing in the inside thereof is defined as (b-2), its mass ratio (b-1)/(b-2) is preferably within the range of from 0.05 to 50, more preferably in the range of from 0.1 to 30, and still more preferably in the range of from 0.5 to 20. In the case where the range of the mass ratio is smaller than 0.05, namely, when the proportion of the additive (b-1) existing on the surface is too small, there is a case where the blocking resistance of the thermoplastic elastomer pellet is not sufficient; whereas in the case where it is larger than 50, namely when the proportion of the additive (b-1) existing on the surface is too large, there is a case where the tackiness and transparency of the thermoplastic elastomer pellet are not sufficient.

From the viewpoint of blocking resistance, a deposition amount of the additive (b-1) existing on the surface of the thermoplastic elastomer pellet is preferably in the range of from 400 to 20,000 ppm, more preferably in the range of from 1,000 to 15,000 ppm, and still more preferably in the range of from 1,500 to 10,000 ppm relative to the whole mass of the thermoplastic elastomer pellet. The deposition amount may be measured using $^1$H-NMR. In the case where the additives (b-1) and (b-2) are the same kind, the deposition amount may be calculated by a method in which a thermoplastic elastomer pellet having the additive (b-1) deposited thereon and a thermoplastic elastomer pellet not having the additive (b-1) deposited thereon are prepared, the content of each additive (b) is measured, and a difference in the content is taken; a method in which the surface of the thermoplastic elastomer pellet is washed with a reagent (for example, an alcohol, acetone, etc.) which does not dissolve the thermoplastic elastomer pellet and the additive (b) therein, and the amount of the additive (b-1) contained in the washed liquid is measured; or the like.

An average value of a circle equivalent diameter of the additive (b-1) existing on the surface of the thermoplastic elastomer pellet is preferably within the range of from 0.05 to 50 μm, more preferably within the range of from 0.1 to 40 μm, and still more preferably within the range of from 0.3 to 10 μm. When the average value of the circle equivalent diameter is larger than 50 μm, there is a tendency that the blocking resistance of the thermoplastic elastomer pellet is inferior. The average value of the circle equivalent diameter may be determined through observation of the surface of the thermoplastic elastomer pellet by a scanning electron microscope (SEM) or the like.

In addition, a median diameter (d50) of the additive (b-1) is preferably 100 μm or less, more preferably 90 μm or less, and still more preferably 80 μm or less. When the median diameter (d50) is larger than 100 μm, there is a tendency that not only a large addition amount is necessary for the purpose of revealing the blocking resistance, but also the blocking resistance of the resulting thermoplastic elastomer pellet is inferior. The median diameter (d50) may be determined by measuring the additive (b-1) using a laser diffraction apparatus.

[Thermoplastic Elastomer Pellet]

The thermoplastic elastomer pellet according to the present invention is a pellet of a thermoplastic elastomer composition containing 100 parts by mass of the hydrogenated block copolymer (a) and 0.01 to 5 parts by mass of the additive (b). In the thermoplastic elastomer composition, in addition to the aforementioned components, other component may be contained depending upon the object within the range where the effect of the present invention is not impaired. Examples of such other component may include various additives, such as a heat stabilizer, a neutralizing agent, an antifogging agent, a colorant, an antistatic agent, a crosslinking agent, a conductivity-imparting agent, an anti-microbial agent, an antifungal agent, a metal deactivator, etc., a thermoplastic resin, a tackifying resin, a rubber softener, an elastomer other than the above-described essential components, and the like. One or more selected from these may be arbitrarily used either singly or as combined. Here, examples of the thermoplastic resin include a polyolefin-based resin, such as an ethylene-based resin, polypropylene, etc., a polystyrene-based resin, and the like. Examples of the ethylene-based resin include homopolymers of ethylene, such as high-density polyethylene, low-density polyethylene, etc.; ethylene-α-olefin copolymers, such as an ethylene-propylene copolymer, an ethylene-1-butene copolymer, an ethylene-1-hexene copolymer, an ethylene-1-heptene copolymer, an ethylene-1-octene copolymer, an ethylene-4-methyl-1-pentene copolymer, an ethylene-1-nonene copolymer, an ethyelene-1-decene copolymer, etc.; copolymers of ethylene, such as an ethylene-vinyl acetate copolymer, an ethylene-acrylic acid copolymer, an ethylene-acrylic ester copolymer, an ethylene-methacrylic acid copolymer, an ethylene-methacrylic ester copolymer, or resins obtained by modifying those copolymers with maleic anhydride, etc., etc.; and the like. In the case of containing such a polyolefin-based resin, its content is 30% by mass or less, and preferably 20% by mass or less of the whole mass of the thermoplastic elastomer composition pellet.

Examples of the polystyrene-based resin may include polystyrene, poly-ortho-methylstyrene, poly-para-methylstyrene, polydimethylstyrene, poly-meta-ethylstyrene, polychlorostyrene, polyisopropylstyrene, poly(t-butylstyrene), poly-α-methylstyrene, polyethylvinyltoluene, a styrene-α-methylstyrene copolymer, a styrene-maleimide copolymer, a styrene-N-phenylmaleimide copolymer, a styrene-N-phenylmaleimide-acrylonitrile copolymer, a styrene-N-phenylmaleimide-methyl methacrylate copolymer, a styrene-N-phenylmaleimide-butyl acrylate copolymer, a rubber-reinforced impact-resistant polystyrene, a styrene-acrylonitrile copolymer (AS resin), a styrene-acrylonitrile-butadiene copolymer (ABS resin), an ethylene-propylene rubber-reinforced styrene-acrylonitrile copolymer (AES resin), a polyacrylate rubber-reinforced styrene-acrylonitrile copolymer (AAS resin), a styrene-methyl methacrylate copolymer (MS resin), a styrene-methyl methacrylate-butadiene copolymer (MBS resin), and the like. In the case of containing such a styrene-based resin, its content is 30% by mass or less, and preferably 20% by mass or less of the whole mass of the thermoplastic elastomer pellet.

Examples of the tackifying resin include a petroleum-based resin, such as an aliphatic copolymer, an aromatic copolymer, an aliphatic/aromatic copolymer, an alicyclic copolymer, etc., a coumarone-indene-based resin, a terpene-based resin, a terpene phenol-based resin, a rosin-based resin, such as polymerized rosin, etc., or a hydrogenated product thereof, and the like. In the case of containing such a tackifying resin, its content is 30% by mass or less, and preferably 20% by mass or less of the whole mass of the thermoplastic elastomer pellet.

Examples of the rubber softener include mineral oils, such as paraffinic process oil, naphthenic process oil, etc.; vegetable oils, such as peanut oil, rosin, etc.; phosphoric esters; low-molecular-weight polyethylene glycol; liquid paraffin; synthetic oils, such as low-molecular-weight polyethylene, an ethylene-α-olefin co-oligomer, liquid polybutene, liquid polyisobutylene, liquid polyisoprene or its hydrogenated products, liquid polybutadiene or its hydrogenated products, etc.; and the like. Of those, from the standpoint of compatibility with the hydrogenated block copolymer (a), an oil, such as paraffinic process oil, liquid paraffin, etc., in which the carbon number of the paraffin chain accounts for 50% or more of the carbon number of the whole of molecule, is suitably used. A kinetic viscosity of the rubber softener is preferably within the range of from 10 to 500 $mm^2/s$, more preferably within the range of from 15 to 400 $mm^2/s$, and still more preferably within the range of from 20 to 300 $mm^2/s$ in terms of a kinetic viscosity at 40° C. One or more selected from these may be used either singly or as combined. In the case of containing such a rubber softener, its content is 45% by mass or less, and preferably 20% by mass or less of the whole mass of the thermoplastic elastomer pellet.

A hardness of the thermoplastic elastomer composition constituting the thermoplastic elastomer pellet according to the present invention as measured after 15 seconds using a Type A durometer as prescribed in JIS K6253 is preferably 70 or less, more preferably 50 or less, and still more preferably 35 or less from the standpoint of flexibility of the molded article produced from the thermoplastic elastomer pellet. When the hardness of the thermoplastic elastomer composition is higher than 70, there is a tendency that the flexibility is inferior.

In addition, other component may be externally added onto the surface of the thermoplastic elastomer pellet according to the object within the range where the effect of the present invention is not impaired. Examples of such other component include powdered materials of various additives, such as an antifogging agent, a colorant, an antistatic agent, an antimicrobial agent, an antifungal agent, etc., a thermoplastic resin, a tackifying resin, a powdered material of a thermoplastic elastomer, a filler, such as talc, silica, calcium carbonate, clay, etc., and the like. A content thereof is 30% by mass or less, preferably 20% by mass or less, and more preferably 10% by mass or less of the whole mass of the additive on the surface of the thermoplastic elastomer pellet.

[Production Method of Thermoplastic Elastomer Pellet]

Though a production method of the thermoplastic elastomer pellet is not particularly limited, the thermoplastic elastomer pellet containing the additive (b) in the inside of the pellet may be produced by adding the additive (b) to the hydrogenated block copolymer (a) and then mixing the contents, followed by pelletization by a known method. Examples of the method of producing the thermoplastic elastomer pellet include a method in which the additive (b) is added in a polymerization reaction solution or a hydrogenation reaction liquid at the time of producing the hydrogenated block copolymer (a) and then dried, followed by pelletization using a melt kneading device, such as a single-screw extruder, a twin-screw extruder, etc.; a method in which the additive (b) is added to the dried hydrogenated block copolymer (a) and preliminarily mixed using a mixing device, such as a tumbler mixer, a ribbon blender, a high-speed mixer, etc., followed by pelletization using a melt kneading device, such as a single-screw extruder, a twin-screw extruder, etc.; and the like. Examples of the method of pelletization include a method of using a single-screw or a twin-screw extruder and undergoing cutting with a rotary blade installed in front of a die head of the extruder; a method of using a single-screw or a twin-screw extruder and extruding the thermoplastic elastomer composition in a strand form, followed by undergoing cutting with a strand cutter; and the like.

The thermoplastic elastomer pellet according to the present invention may be obtained by further externally adding the additive (b) to the thermoplastic elastomer pellet containing the additive (b) in the inside of the pellet obtained by the aforementioned method or the like. Though the external addition method of the additive (b) is not particularly limited, examples thereof include a method in which the resulting pellet and the additive (b) are charged in a mixer, such as a tumbler mixer, a high-speed mixer, etc., and mixed; a method in which the additive (b) is dispersed in water for cooling at the time of pellet production, and the pellet of the thermoplastic elastomer composition is then brought into contact therewith; a method in which at the time of pellet production, a necessary amount of the additive (b) is continuously added and brought into contact with the pellet in a production line using a feeder or the like; and the like.

[Molded Article]

A molded article may be produced by forming from the thermoplastic elastomer pellet according to the present invention by a known method, for example, extrusion molding, injection molding, press molding, calender molding, or the like. In addition, complexation with other member (for example, a polymer material, such as polyethylene, polypropylene, an olefinic elastomer, an ABS resin, a polyamide, etc., a metal, a wood, a fabric, or the like) may also be achieved by a two-color molding method. Furthermore, the thermoplastic elastomer pellet according to the present invention may also be formed into a film, a sheet, or the like by dissolving it in a solvent optionally together with other component, to prepare a composition solution, followed by applying and drying.

In the case of forming the thermoplastic elastomer pellet according to the present invention into a film, the film may be either a single-layered film using singly the thermoplastic elastomer pellet according to the present invention, or a multilayered film obtained by extruding the thermoplastic elastomer pellet according to the present invention together with a thermoplastic resin, such as polyethylene, etc. As a method of producing a single-layered or laminated film, a known formation technique, such as T-die film formation with a single-layered or multilayered die, extrusion lamination molding, coextrusion molding, etc., may be adopted. A thickness of the film is preferably within the range of from 10 to 500 µm.

The thermoplastic elastomer pellet according to the present invention is excellent in tackiness and transparency, and therefore, it may be suitably used for applications, for example, a pressure sensitive adhesive used for optical members requiring transparency, etc., a pressure sensitive adhesive protective film, or the like.

EXAMPLES

The present invention is hereunder described in detail with reference to Examples and Comparative Examples, but it should not be construed that the present invention is limited thereto. In the following Examples and Comparative Examples, physical properties and the like of the thermoplastic elastomer pellet were evaluated by the following methods.

(1) Solubility of Additive in Toluene at Room Temperature

In a 110-cc glass bottle, 45 g of toluene and 5 g of an additive were charged and shaken with a shaking apparatus at room temperature for 8 hours, and the presence or absence of an insoluble residue of the additive was visually confirmed. The case where an insoluble residue was absent was evaluated as "absent", and the case where an insoluble residue was observed was evaluated as "present". The results are shown in Table 2.

(2) Measurement of Particle Diameter of Additive

A median diameter (d50) was measured with a laser diffraction/scattering particle diameter measuring apparatus, LA-950 (manufactured by Horiba, Ltd.). The results are shown in Table 2.

(3) Measurement of Circle Equivalent Diameter of Additive on the Surface of Thermoplastic Elastomer Pellet A photograph of a thermoplastic elastomer pellet was taken with a scanning electron microscope (JSM-6510, manufactured by dEOL Ltd.) at a magnification of 1,000 times, and the resulting photograph was analyzed with an image analysis/calculation software, image-Pro-Plus (manufactured by Planetron, Inc.).

(4) Measurement of Styrene Content, Amount of 1,4-Bond, and Degree of Hydrogenation of Hydrogenated Block Copolymer All were determined by means of $^1$H-NMR spectrometry.
Apparatus: JNM-Lambda 500 (manufactured by JEOL Ltd.)
Solvent: Heavy chloroform
Measurement temperature: 50° C.

(5) Measurement of Weight Average Molecular Weight (Mw) of Hydrogenated Block Copolymer A weight average molecular weight (Mw) as converted to polystyrene was determined by means of gel permeation chromatography (GPC).
Apparatus: HLC-8320GPC (manufactured by Tosoh Corporation)
Solvent: Tetrahydrofuran
Measurement temperature: 40° C.
Flow rate: 1 mL/min
Injection amount: 150 µL, concentration: 5 mg/10 cc (hydrogenated block copolymer/THF)

(6) Measurement of Amounts (ppm) of Additives (b-1) and (b-2) Existing on the Surface and in the Inside of Thermoplastic Elastomer Pellet The amounts of the additives (b-1) and (b-2) were determined by means of $^1$H-NMR spectrometry under the same condition as in the aforementioned item (4). In the case where the additives (b-1) and (b-2) are the same kind, the addition amount was determined by preparing a thermoplastic elastomer pellet having the additive (b-1) deposited thereon and a thermoplastic elastomer pellet not having the additive (b-1) deposited thereon, measuring the content of each additive (b), and then taking a difference in the content.

(7) Measurement of Hardness

A thermoplastic elastomer pellet obtained in each of the Examples and Comparative Examples was formed using a press molding machine under a temperature condition of 200° C., thereby obtaining a press molded sheet having a thickness of 2 mm. The resulting press molded sheets were superimposed to an extent of 6 mm in thickness, and a numerical value after 15 seconds using a Type A durometer as prescribed in JIS K6253 was read out and evaluated.

(8) Blocking Breakage Strength (Anti-Blocking Test)

30 g of a thermoplastic elastomer pellet obtained in each of the Examples and Comparative Examples was charged in a 100-mL disposable cup; a weight of 1,000 g was placed thereon; the resultant was allowed to stand in a gear oven at 60° C. for 48 hours, then taken out, and allowed to stand for 30 minutes in a room whose temperature was adjusted at 23° C.; the pellet was then taken out from the container and subjected to a compression test with an Instron 5566 Model tensile tester at a compression rate of 10 mm/min; and a load at which blocking was broken was measured. It is meant that as the load at which the breakage occurs is small, the blocking is not caused, so that the blocking resistance is excellent.

(9) Measurement of Haze (Transparency Test)

A thermoplastic elastomer pellet obtained in each of the Examples and Comparative Examples was dissolved in toluene to an extent of a concentration of 25 wt %, and thereafter, the toluene solution was cast. The resultant was naturally dried over one week and then dried with a vacuum dryer at 100° C. for 2 hours, thereby preparing a film having a thickness of 50 µm. The resulting film was measured for haze using a haze & reflection meter, HR-100 (manufactured by Murakami Color Research Laboratory Co., Ltd.) in conformity with JIS K7136.

(10) Peel Strength (Tackiness Test)

A thermoplastic elastomer pellet obtained in each of the Examples and Comparative Examples was dissolved in toluene to an extent of a concentration of 20 wt %; thereafter, the toluene solution was coated on a PET film using a bar coater, ROD NO55 (manufactured by Tester Sangyo Co., Ltd.); and the resultant was dried in an oven at 60° C. for 30 minutes, thereby preparing a pressure sensitive adhesive film having a thickness of 25 μm. The resulting pressure sensitive adhesive film was cut in a width of 25 mm and then stuck onto a PMMA sheet using a roller with a load of 2 kg; and after 24 hours, the resultant was measured for peel strength with an Instron 5566 Model tensile tester in an environment of 23° C. at a peel speed of 300 mm/min. In addition, whether or not the adhesive residue was present on the PMMA sheet after peeling was visually confirmed, and the case where an adhesive residue was absent was evaluated as "absent", and the case where an adhesive residue was observed was evaluated as "present".

Synthesis Example 1

In a nitrogen-purged, dried pressure container, 2,500 mL of, as a solvent, cyclohexane and, as an initiator, 26.4 mL of sec-butyllithium having a concentration of 10.5% by mass (cyclohexane solution) were charged, and after increasing the temperature to 50° C., 101 mL of styrene was added to perform polymerization for 60 minutes.

Thereafter, an operation of increasing the temperature to 60° C., then adding 10 mL of isoprene to perform reaction, and after elapsing 3 minutes, adding the same amount of isoprene to perform reaction was repeatedly performed, thereby finally adding 1,092 mL of isoprene in total. Thereafter, the reaction was further driven for 90 minutes, and the polymerization was then stopped with 1.5 mL of methanol, thereby obtaining a block copolymer-containing polymerization reaction liquid.

To this reaction mixture, 41.8 g of palladium-on-carbon (supporting amount of palladium: 5% by mass) as a hydrogenation catalyst was added to perform hydrogenation reaction at a hydrogen pressure of 2 MPa and at 150° C. for 10 hours. After allowing the reaction mixture to cool and releasing the pressure, the palladium-on-carbon was removed by means of filtration, and the filtrate was concentrated and further vacuum dried to obtain a hydrogenated block copolymer (a1)-1.

The analysis results of the resulting hydrogenated block copolymer (a1)-1 are shown in Table 1.

Synthesis Example 2

In a nitrogen-purged, dried pressure container, 2,500 mL of, as a solvent, cyclohexane and, as an initiator, 17.8 mL of sec-butyllithium having a concentration of 10.5% by mass (cyclohexane solution) were charged, and after increasing the temperature to 50° C., 138 mL of styrene was added to perform polymerization for 60 minutes.

Thereafter, an operation of adding 7 mL of THF, then adding 10 mL of butadiene at the same temperature to perform reaction, and after elapsing 3 minutes, adding the same amount of butadiene to perform reaction was repeatedly performed, thereby finally adding 1,144 mL of butadiene in total. Thereafter, the reaction was further driven for 90 minutes, and the polymerization was then stopped with 1.1 mL of methanol, thereby obtaining a block copolymer-containing polymerization reaction liquid.

To this reaction mixture, 41.8 g of palladium-on-carbon (supporting amount of palladium: 5% by mass) as a hydrogenation catalyst was added to perform hydrogenation reaction at a hydrogen pressure of 2 MPa and at 150° C. for 10 hours. After allowing the reaction mixture to cool and releasing the pressure, the palladium-on-carbon was removed by means of filtration, and the filtrate was concentrated and further vacuum dried to obtain a hydrogenated block copolymer (a1)-2.

The analysis results of the resulting hydrogenated block copolymer (a1)-2 are shown in Table 1.

Synthesis Example 3

In a nitrogen-purged, dried pressure container, 2,500 mL of, as a solvent, cyclohexane and, as an initiator, 20.8 mL of sec-butyllithium having a concentration of 10.5% by mass (cyclohexane solution) were charged, and after increasing the temperature to 50° C., 120 mL of styrene was added to perform polymerization for 60 minutes.

Thereafter, an operation of decreasing the temperature to 40° C., adding 14.2 mL of THF, adding 10 mL of a mixture of isoprene and butadiene (50/50 in mass ratio) to perform reaction, and after elapsing 3 minutes, adding the same amount of a mixture of isoprene and butadiene (50/50 in mass ratio) to perform reaction was repeatedly performed, thereby finally adding 1,117 mL of the mixture of isoprene and butadiene in total. Thereafter, the reaction was further driven for 150 minutes, and the polymerization was then stopped with 1.2 mL of methanol, thereby obtaining a block copolymer-containing polymerization reaction liquid.

To this reaction mixture, 41.8 g of palladium-on-carbon (supporting amount of palladium: 5% by mass) as a hydrogenation catalyst was added to perform hydrogenation reaction at a hydrogen pressure of 2 MPa and at 150° C. for 10 hours. After allowing the reaction mixture to cool and releasing the pressure, the palladium-on-carbon was removed by means of filtration, and the filtrate was concentrated and further vacuum dried to obtain a hydrogenated block copolymer (a1)-3.

The analysis results of the resulting hydrogenated block copolymer (a1)-3 are shown in Table 1.

Synthesis Example 4

In a nitrogen-purged, dried pressure container, 3,000 mL of, as a solvent, cyclohexane and, as an initiator, 8.4 mL of sec-butyllithium having a concentration of 10.5% by mass (cyclohexane solution) were charged, and after increasing the temperature to 50° C., 64 mL of styrene was added to perform polymerization for 60 minutes.

Thereafter, an operation of increasing the temperature to 60° C., then adding 10 mL of isoprene to perform reaction, and after elapsing 3 minutes, adding the same amount of isoprene to perform reaction was repeatedly performed, thereby finally adding 687 mL of isoprene in total. Thereafter, the reaction was further driven for 90 minutes.

Furthermore, 64 mL of styrene was added at the same temperature to perform polymerization for 60 minutes, and the polymerization was then stopped with 0.47 mL of methanol, thereby obtaining a block copolymer-containing polymerization reaction liquid.

To this reaction mixture, 29.3 g of palladium-on-carbon (supporting amount of palladium: 5% by mass) as a hydrogenation catalyst was added to perform hydrogenation reaction at a hydrogen pressure of 2 MPa and at 150° C. for 10 hours. After allowing the reaction mixture to cool and releasing the pressure, the palladium-on-carbon was removed by means of filtration, and the filtrate was concentrated and further vacuum dried to obtain a hydrogenated block copolymer (a2)-1.

The analysis results of the resulting hydrogenated block copolymer (a2)-1 are shown in Table 1.

Synthesis Example 5

In a nitrogen-purged, dried pressure container, 3,000 mL of, as a solvent, cyclohexane and, as an initiator, 2.8 mL of sec-butyllithium having a concentration of 10.5% by mass (cyclohexane solution) were charged, and after increasing the temperature to 50° C., 25 mL of styrene was added to perform polymerization for 60 minutes.

Thereafter, an operation of increasing the temperature to 60° C., then adding 10 mL of isoprene to perform reaction, and after elapsing 3 minutes, adding the same amount of isoprene to perform reaction was repeatedly performed, thereby finally adding 540 mL of isoprene in total. Thereafter, the reaction was further driven for 90 minutes.

Furthermore, 25 mL of styrene was added at the same temperature to perform polymerization for 60 minutes, and the polymerization was then stopped with 0.16 mL of methanol, thereby obtaining a block copolymer-containing polymerization reaction liquid.

To this reaction mixture, 20.6 g of palladium-on-carbon (supporting amount of palladium: 5% by mass) as a hydrogenation catalyst was added to perform hydrogenation reaction at a hydrogen pressure of 2 MPa and at 150° C. for 10 hours. After allowing the reaction mixture to cool and releasing the pressure, the palladium-on-carbon was removed by means of filtration, and the filtrate was concentrated and further vacuum dried to obtain a hydrogenated block copolymer (a2)-2.

The analysis results of the resulting hydrogenated block copolymer (a2)-2 are shown in Table 1.

Synthesis Example 6

In a nitrogen-purged, dried pressure container, 3,000 mL of, as a solvent, cyclohexane and, as an initiator, 6.7 mL of sec-butyllithium having a concentration of 10.5% by mass (cyclohexane solution) were charged, and after increasing the temperature to 50° C., 48 mL of styrene was added to perform polymerization for 60 minutes.

Thereafter, an operation of adding 8 mL of THF, adding 10 mL of butadiene to perform reaction, and after elapsing 3 minutes, adding the same amount of butadiene to perform reaction was repeatedly performed, thereby finally adding 800 mL of butadiene in total. Thereafter, the reaction was further driven for 90 minutes.

Furthermore, 48 mL of styrene was added at the same temperature to perform polymerization for 60 minutes, and the polymerization was then stopped with 0.39 mL of methanol, thereby obtaining a block copolymer-containing polymerization reaction liquid.

To this reaction mixture, 29.3 g of palladium-on-carbon (supporting amount of palladium: 5% by mass) as a hydrogenation catalyst was added to perform hydrogenation reaction at a hydrogen pressure of 2 MPa and at 150° C. for 10 hours. After allowing the reaction mixture to cool and releasing the pressure, the palladium-on-carbon was removed by means of filtration, and the filtrate was concentrated and further vacuum dried to obtain a hydrogenated block copolymer (a2)-3.

The analysis results of the resulting hydrogenated block copolymer (a2)-3 are shown in Table 1.

Synthesis Example 7

In a nitrogen-purged, dried pressure container, 3,000 mL of, as a solvent, cyclohexane and, as an initiator, 3.6 mL of sec-butyllithium having a concentration of 10.5% by mass (cyclohexane solution) were charged, and after increasing the temperature to 50° C., 42 mL of styrene was added to perform polymerization for 60 minutes.

Thereafter, an operation of decreasing the temperature to 40° C., adding 17 mL of THF, adding 10 mL of a mixture of isoprene and butadiene (50/50 in mass ratio) to perform reaction, and after elapsing 3 minutes, adding the same amount of a mixture of isoprene and butadiene (50/50 in mass ratio) to perform reaction was repeatedly performed, thereby finally adding 782 mL of the mixture of isoprene and butadiene in total. Thereafter, the reaction was further driven for 150 minutes.

Thereafter, after increasing the temperature to 50° C., 42 mL of styrene was added to perform polymerization for 60 minutes, and the polymerization was then stopped with 0.20 mL of methanol, thereby obtaining a block copolymer-containing polymerization reaction liquid.

To this reaction mixture, 29.3 g of palladium-on-carbon (supporting amount of palladium: 5% by mass) as a hydrogenation catalyst was added to perform hydrogenation reaction at a hydrogen pressure of 2 MPa and at 150° C. for 10 hours. After allowing the reaction mixture to cool and releasing the pressure, the palladium-on-carbon was removed by means of filtration, and the filtrate was concentrated and further vacuum dried to obtain a hydrogenated block copolymer (a2)-4.

The analysis results of the resulting hydrogenated block copolymer (a2)-4 are shown in Table 1.

TABLE 1

| Hydrogenated block copolymer (a) | Styrene content (wt %) | Weight average molecular weight (Mw) | Degree of hydrogenation (mol %) | Amount of 1,4-bond (%) |
|---|---|---|---|---|
| Synthesis Example 1: Hydrogenated block copolymer (a1)-1 | 11 | 46100 | 99.8 | 94 |
| Synthesis Example 2: Hydrogenated block copolymer (a1)-2 | 15 | 65500 | 98.3 | 52 |
| Synthesis Example 3: Hydrogenated block copolymer (a1)-3 | 13 | 50900 | 95.6 | 41 |
| Synthesis Example 4: Hydrogenated block copolymer (a2)-1 | 20 | 98200 | 98.6 | 94 |
| Synthesis Example 5: Hydrogenated block copolymer (a2)-2 | 11 | 215300 | 99.3 | 93 |

TABLE 1-continued

| Hydrogenated block copolymer (a) | Styrene content (wt %) | Weight average molecular weight (Mw) | Degree of hydrogenation (mol %) | Amount of 1,4-bond (%) |
|---|---|---|---|---|
| Synthesis Example 6: Hydrogenated block copolymer (a2)-3 | 15 | 131000 | 97.8 | 55 |
| Synthesis Example 7: Hydrogenated block copolymer (a2)-4 | 13 | 203500 | 94.6 | 42 |

(Additives 1 to 10)

With respect to the various additives used in the Examples and Comparative Examples, the median diameter and the solubility in toluene were evaluated according to the aforementioned methods. The results are shown in Table 2.

TABLE 2

| Additive (b) | Trade name | Manufacturer | Median diameter d50 (μm) | Solubility in toluene (presence or absence of insoluble residue of additive) |
|---|---|---|---|---|
| Antioxidant-1 (molecular weight: 1178) | AO-60 | Adeka Corporation | 15.8 | Absent |
| Antioxidant-2 (molecular weight: 741) | AO-80 | Adeka Corporation | 27 | Absent |
| Antioxidant-3 (molecular weight: 775) | AO-330 | Adeka Corporation | 70 | Absent |
| Light stabilizer-1 (molecular weight: 316) | SUMISORB 300 | Sumika Chemtex Co., Ltd. | 26 | Absent |
| Light stabilizer-2 (molecular weight: 481) | TINUVIN 770 | BASF SE | 79 | Absent |
| PP powder | CERAFLOUR 970 | BYK Japan KK | 9.0 | Present |
| PE powder | ACUMIST B-6 | Honeywell International Inc. | 7.2 | Present |
| Metallic soap (calcium stearate, molecular weight: 607) | Calcium stearate GP | NOF Corporation | 65 | Present |
| Lubricant (erucic acid amide, molecular weight: 337) | ARMOSLIP E | Lion Akzo Co., Ltd. | 280 | Absent |
| Talc | SG-95 | Nippon Talc Co., Ltd. | 2.5 | Present |

(Preparation of Pellets 1 to 8)

Using a twin-screw extruder, ZSK26 Mega Compounder (L/D=54), manufactured by Coperion GmbH, the hydrogenated block copolymer obtained in each of Synthesis Examples 1 to 7 and the additive (b-2) existing in the inside of the pellet were melt kneaded in a composition shown in Table 3 at a screw rotation speed of 300 rpm and at a kneading temperature of 200° C., thereby producing Pellets 1 to 8 of the thermoplastic elastomer composition. Compositions of the Pellets 1 to 8 are shown in Table 3.

TABLE 3

| | Pellet 1 | Pellet 2 | Pellet 3 | Pellet 4 | Pellet 5 | Pellet 6 | Pellet 7 | Pellet 8 |
|---|---|---|---|---|---|---|---|---|
| Composition ratio (parts by mass) | | | | | | | | |
| Hydrogenated block copolymer (a) | | | | | | | | |
| Hydrogenated block copolymer (a1)-1 | | 55 | 60 | 70 | 40 | 50 | | |
| Hydrogenated block copolymer (a1)-2 | | | | | | | 30 | |
| Hydrogenated block copolymer (a1)-3 | | | | | | | | 55 |
| Hydrogenated block copolymer (a2)-1 | 100 | | | | | 50 | | |
| Hydrogenated block copolymer (a2)-2 | | 45 | 40 | 30 | 60 | | | |
| Hydrogenated block copolymer (a2)-3 | | | | | | | 70 | |
| Hydrogenated block copolymer (a2)-4 | | | | | | | | 45 |

TABLE 3-continued

|  | Pellet 1 | Pellet 2 | Pellet 3 | Pellet 4 | Pellet 5 | Pellet 6 | Pellet 7 | Pellet 8 |
|---|---|---|---|---|---|---|---|---|
| Additive (b-2) existing in the inside of pellet |  |  |  |  |  |  |  |  |
| Antioxidant-1 | 0.2 | 0.3 | 0.2 | 0.1 | 0.2 | 0.15 | 0.2 | 0.2 |
| (α)/(β)* | — | 1.01 | 1.01 | 1.01 | 1.01 | 1.01 | 0.95 | 0.98 |

*A ratio of an amount (α) of the 1-4-bond that the polymer block B of the hydrogenated block copolymer (a1) has to an amount (β) of the 1,4-bond that the polymer block B of the hydrogenated block copolymer (a2) has

Example 1

Pellet 1 was charged into a super mixer, SMV-20 (manufactured by Kawata Mfg. Co., Ltd.); as the additive (b-1) existing on the surface of the pellet, Antioxidant-1 was then added in a proportion shown in Table 4; and the contents were stirred at a stirring speed of 500 rpm for 3 minutes, thereby preparing a thermoplastic elastomer pellet in which the additive (b) existed in the inside and on the surface of the pellet. With respect to the resulting thermoplastic elastomer pellet, physical properties were evaluated according to the aforementioned methods. The results are shown in Table 4.

Examples 2 to 11 and Comparative Examples 1 to 6

Components were blended in compositions shown in Tables 4 and 5, and thermoplastic elastomer pellets were prepared in the same method as in Example 1. With respect to the resulting thermoplastic elastomer pellets, physical properties were evaluated according to the aforementioned methods. The results are shown in Tables 4 and 5.

TABLE 4

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Composition ratio (parts by mass) Hydrogenated block copolymer composition pellet |  |  |  |  |  |  |  |  |  |  |  |
| Pellet 1 | 100 |  |  |  |  |  |  |  |  |  |  |
| Pellet 2 |  | 100 | 100 |  |  |  |  |  |  | 100 | 100 |
| Pellet 3 |  |  |  | 100 |  |  |  |  |  |  |  |
| Pellet 4 |  |  |  |  | 100 |  |  |  |  |  |  |
| Pellet 5 |  |  |  |  |  | 100 |  |  |  |  |  |
| Pellet 6 |  |  |  |  |  |  | 100 |  |  |  |  |
| Pellet 7 |  |  |  |  |  |  |  | 100 |  |  |  |
| Pellet 8 |  |  |  |  |  |  |  |  | 100 |  |  |
| Additive (b-1) to be externally added to pellet |  |  |  |  |  |  |  |  |  |  |  |
| Additive species | Antioxidant-1 | Antioxidant-1 | Antioxidant-1 | Antioxidant-1 | Antioxidant-1 | Antioxidant-1 | Antioxidant-1 | Antioxidant-2 | Antioxidant-3 | Light stabilizer-1 | Light stabilizer-2 |
| Addition amount | 0.2 | 0.05 | 0.4 | 0.5 | 0.7 | 0.3 | 0.6 | 0.4 | 0.9 | 0.25 | 0.2 |
| Average value of circle equivalent diameter of additive (b-1) deposited on pellet (μm) | 2.1 | 2.8 | 1.8 | 1.7 | 1.6 | 2.0 | 1.6 | 1.4 | 2.5 | 2.6 | 3.3 |
| Content of additive (b-2) in the inside of pellet (ppm) | 1970 | 2970 | 2970 | 2030 | 990 | 1980 | 1480 | 2010 | 1990 | 2970 | 2970 |
| Deposition amount of additive (b-1) (ppm) | 1800 | 490 | 3500 | 4200 | 4800 | 2200 | 3900 | 3200 | 7200 | 2300 | 1800 |
| Additive (b-1)/ additive (b-2) ratio | 0.91 | 0.16 | 1.18 | 2.07 | 4.85 | 1.11 | 2.64 | 1.59 | 3.62 | 0.77 | 0.61 |
| Physical properties |  |  |  |  |  |  |  |  |  |  |  |
| Hardness (Shore A, after 15 seconds) | 68 | 24 | 24 | 22 | 20 | 32 | 28 | 49 | 20 | 24 | 24 |
| Blocking breakage strength (N) | 36 | 150 | 60 | 58 | 62 | 40 | 44 | 42 | 72 | 80 | 86 |
| Film haze (%) | 0.4 | 0.4 | 0.5 | 0.6 | 0.7 | 0.4 | 0.6 | 0.5 | 0.9 | 0.8 | 0.6 |
| Peel strength (N/25 mm) | 8 | 20 | 20 | 23 | 26 | 13 | 15 | 8 | 19 | 19 | 18 |
| Presence or absence of adhesive residue on PMMA sheet | Absent | Absent | Absent | Absent | Absent | Absent | Absent | Absent | Absent | Absent | Absent |

TABLE 5

|  | Comparative Example 1 | Comparative Example 2 | Comparative Example 3 | Comparative Example 4 | Comparative Example 5 | Comparative Example 6 |
|---|---|---|---|---|---|---|
| Composition ratio (parts by mass) Hydrogenated block copolymer composition pellet | | | | | | |
| Pellet 2 | 100 | 100 | 100 | 100 | 100 | 100 |
| Additive (b-1) to be externally added to pellet | | | | | | |
| Additive species | No | PP powder | PE powder | Calcium stearate | Erucic acid amide | Talc |
| Addition amount | 0 | 0.4 | 0.4 | 0.4 | 0.4 | 0.4 |
| Average value of circle equivalent diameter of additive (b-1) deposited on pellet (μm) | — | 1.5 | 1.4 | 3.8 | 13 | 0.8 |
| Content of additive (b-2) in the inside of pellet (ppm) | 2970 | 2880 | 2970 | 2970 | 2970 | 2970 |
| Deposition amount of additive (b-1) (ppm) | 0 | 3752 | 3888 | 3656 | 1680 | 3760 |
| Additive (b-1)/additive (b-2) ratio | 0 | 1.30 | 1.31 | 1.23 | 0.57 | 1.27 |
| Physical properties | | | | | | |
| Hardness (Shore A, after 15 seconds) | 24 | 24 | 24 | 24 | 24 | 24 |
| Blocking breakage strength (N) | >400 | 62 | 49 | 45 | 42 | 27 |
| Film haze (%) | 0.4 | 28 | 35 | 4.1 | 0.8 | 16 |
| Peel strength (N/25 mm) | 21 | 15 | 13 | 7 | <0.1 | 17 |
| Presence or absence of adhesive residue on PMMA sheet | Absent | Present | Present | Present | Present | Present |

It is noted from Tables 4 and 5 that the thermoplastic elastomer pellets obtained in Examples 1 to 11 are excellent in blocking resistance, transparency, and tackiness.

On the other hand, the thermoplastic elastomer pellet of Comparative Example 1, in which the additive does not exist on the surface of the pellet, is excellent in transparency and tackiness but greatly inferior in blocking resistance. The thermoplastic elastomer pellets of Comparative Examples 2 to 4 and 6 each using an additive falling outside the scope of the present invention on the surface of the pellet, was inferior in transparency and caused an adhesive residue on the adherend. In addition, the thermoplastic elastomer pellet of Comparative Example 5 using an additive falling outside the scope of the present invention was excellent in transparency but had a weak adhesive force and caused an adhesive residue on the adherend.

INDUSTRIAL APPLICABILITY

The thermoplastic elastomer pellet of the present invention is excellent in blocking resistance, and the molded article obtained therefrom is excellent in transparency, tackiness, flexibility, and the like. Therefore, taking advantage of features thereof, they can be used in various fields inclusive of miscellaneous goods, industrial goods, automotive goods, consumer electronics goods, food containers, packaging materials, medical goods, sport goods, and the like.

The invention claimed is:

1. A thermoplastic elastomer pellet that is a pellet of a thermoplastic elastomer composition, comprising:
    (a) 100 parts by mass of a hydrogenated block copolymer; and
    (b) 0.01 to 5 parts by mass of at least one additive selected from the group consisting of an antioxidant and a light stabilizer,
    wherein:
        the hydrogenated block copolymer (a) is a hydrogenated product of a block copolymer having a polymer block A comprising a structural unit derived from an aromatic vinyl compound and a polymer block B comprising a structural unit derived from a conjugated diene compound;
        the additive (b) is soluble in toluene at room temperature;
        the additive (b) exists in the inside and on the surface of the pellet; and
        a part of the additive (b) is externally added and deposited on the surface of the pellet.

2. The thermoplastic elastomer pellet according to claim 1, wherein in the additive (b), a mass ratio ((b-1)/(b-2)) of an additive (b-1) existing on the surface and an additive (b-2) existing in the inside is 0.05 to 50.

3. The thermoplastic elastomer pellet according to claim 2, wherein:
    the hydrogenated block copolymer (a) is at least one selected from the group consisting of a hydrogenated block copolymer (a1) represented by $(A-B)_n$ and a hydrogenated block copolymer (a2) represented by A-B-A or $(A-B)_m-X$; and, wherein
    in the formulae $(A-B)n$, A-B-A and $(A-B)m-X$:
        A independently represents the polymer block A comprising the structural unit derived from the aromatic vinyl compound;
        B independently represents the polymer block B comprising the structural unit derived from the conjugated diene compound;
        n represents an integer of 1 to 3;
        m represents an integer of 1 or more; and
        X represents a coupling agent residue.

4. The thermoplastic elastomer pellet according to claim 3, wherein:
    the hydrogenated block copolymer (a) is a mixture of the hydrogenated block copolymer (a1) and the hydrogenated block copolymer (a2); and
    a mass ratio of the hydrogenated block copolymer (a1) and the hydrogenated block copolymer (a2) is 90/10 to 10/90.

5. The thermoplastic elastomer pellet according to claim 1, wherein:
    the hydrogenated block copolymer (a) is at least one selected from the group consisting of a hydrogenated block copolymer (a1) represented by $(A-B)_n$ and a hydrogenated block copolymer (a2) represented by A-B-A or $(A-B)_m-X$; and in the formulae (A-B)$_n$, A-B-A and (A-B)$_m$-X:
- A independently represents the polymer block A comprising the structural unit derived from the aromatic vinyl compound;
- B independently represents the polymer block B comprising the structural unit derived from the conjugated diene compound;
- n represents an integer of 1 to 3;
- m represents an integer of 1 or more; and
- X represents a coupling agent residue.

6. The thermoplastic elastomer pellet according to claim 5, wherein:
- the hydrogenated block copolymer (a) is a mixture of the hydrogenated block copolymer (a1) and the hydrogenated block copolymer (a2); and
- a mass ratio of the hydrogenated block copolymer (a1) and the hydrogenated block copolymer (a2) is 90/10 to 10/90.

7. The thermoplastic elastomer pellet according to claim 1, wherein:
- the additive (b) comprises an additive (b-1) existing on the surface of the pellet; and
- an average value of a circle equivalent diameter of the additive (b-1) ranges from 0.05 to 50 μm.

8. The thermoplastic elastomer pellet according to claim 1, wherein:
- the additive (b) comprising an additive (b-1) existing on the surface of the pellet, and an additive (b-2) existing within the pellet; and
- a composition of the additive (b-1) is different from a composition of the additive (b-2).

9. The thermoplastic elastomer pellet according to claim 1, wherein the additive (b) comprises:
- an additive (b-1) existing on the surface of the pellet, said additive (b-1) comprising one additive selected from the group consisting of an antioxidant and a light stabilizer; and
- an additive (b-2) existing within the pellet, said additive (b-2) comprising the other additive selected from the group consisting of the antioxidant and the light stabilizer.

10. A molded article formed from the thermoplastic elastomer pellet according to claim 1.

11. A thermoplastic elastomer pellet that is a pellet of a thermoplastic elastomer composition, comprising:
- (a) 100 parts by mass of a hydrogenated block copolymer; and
- (b) 0.01 to 5 parts by mass of an additive comprising a light stabilizer, wherein:
- the hydrogenated block copolymer (a) is a hydrogenated product of a block copolymer having a polymer block A comprising a structural unit derived from an aromatic vinyl compound and a polymer block B comprising a structural unit derived from a conjugated diene compound;
- the additive (b) is soluble in toluene at room temperature; and
- the additive (b) exists in the inside and on the surface of the pellet and a part of the additive (b) is externally added and deposited on the surface of the pellet.

12. A thermoplastic elastomer pellet that is a pellet of a thermoplastic elastomer composition, comprising:
- (a) 100 parts by mass of a hydrogenated block copolymer; and
- (b) 0.01 to 5 parts by mass of at least one additive selected from the group consisting of an antioxidant and a light stabilizer, wherein:
- the hydrogenated block copolymer (a) is a hydrogenated product of a block copolymer having a polymer block A comprising a structural unit derived from an aromatic vinyl compound and a polymer block B comprising a structural unit derived from a conjugated diene compound;
- the additive (b) is soluble in toluene at room temperature;
- the additive (b) exists in the inside and on the surface of the pellet; and
- an amount of the additive (b) existing on the surface of the pellet ranges from 400 to 20000 ppm and a part of the additive (b) is externally added and deposited on the surface of the pellet.

* * * * *